US011958387B2

(12) United States Patent
Wong et al.

(10) Patent No.: US 11,958,387 B2
(45) Date of Patent: Apr. 16, 2024

(54) SEATING IN A VEHICLE (71) Applicant: International Truck Intellectual Property Company, LLC, Lisle, IL (US)

(72) Inventors: Peter S. Wong, Naperville, IL (US); Edward Houlihan, Wheaton, IL (US); Hector R. Kiely, Plainfield, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 168 days.

(21) Appl. No.: 17/332,151

(22) Filed: May 27, 2021

(65) Prior Publication Data

US 2022/0379777 A1 Dec. 1, 2022

(51) Int. Cl.
*B60N 2/24* (2006.01)
*B60N 2/015* (2006.01)
*B60N 2/20* (2006.01)

(52) U.S. Cl.
CPC ............ *B60N 2/242* (2013.01); *B60N 2/015* (2013.01); *B60N 2/20* (2013.01)

(58) Field of Classification Search
CPC .......... B60N 2/242; B60N 2/015; B60N 2/20; B60N 2/68; B60N 2/04; B60N 2/01; B64D 11/06; B64D 11/0648; B64D 11/0649; B64D 11/0693
USPC ............... 296/63, 64, 65.05, 65.09; 287/37.8
See application file for complete search history.

(56) References Cited

U.S. PATENT DOCUMENTS

| 4,489,978 A | 12/1984 | Brennan |
| 8,056,952 B2 | 11/2011 | Almeida et al. |
| 10,988,260 B2 * | 4/2021 | Gross ................. B64D 11/0693 |
| 11,014,676 B2 * | 5/2021 | Bell ......................... B60N 2/68 |
| 11,554,700 B2 * | 1/2023 | Tirel ....................... B60N 2/682 |
| 2009/0184562 A1 | 7/2009 | Wilson et al. |
| 2012/0205329 A1 | 8/2012 | Fujita et al. |
| 2012/0292967 A1 | 11/2012 | Cailleteau |

(Continued)

FOREIGN PATENT DOCUMENTS

| CN | 109693793 A | 4/2019 |
| CN | 208760466 U | 4/2019 |

(Continued)

OTHER PUBLICATIONS

Office Action for China Patent Application No. 202210288807.4, dated Jul. 15, 2023 (18 pages).

(Continued)

*Primary Examiner* — Amy R Weisberg
*Assistant Examiner* — Sara Laghlam
(74) *Attorney, Agent, or Firm* — Mark C. Bach; Umang Khanna (57) ABSTRACT

Seating in a passenger compartment of a vehicle comprises a first base in the passenger compartment of the vehicle. First and second apertures are disposed on opposite ends of the first base. A modified first base having third and fourth apertures is located adjacent the first base. A first rod is disposed in the first and third apertures. A second rod is disposed in the second and fourth apertures. A seat module has an end support including a fifth aperture for accepting the first rod. An opening is disposed on the end support for accepting the second rod.

5 Claims, 8 Drawing Sheets

(56) References Cited

U.S. PATENT DOCUMENTS

| | | | |
|---|---|---|---|
| 2013/0038103 A1 | 2/2013 | Scott et al. | |
| 2018/0170226 A1* | 6/2018 | Furukawa | ............... B60N 2/68 |
| 2019/0118951 A1 | 4/2019 | Abelheira et al. | |
| 2019/0275913 A1 | 9/2019 | O'Connor et al. | |
| 2020/0009993 A1* | 1/2020 | Kakishima | ............ B60N 2/305 |
| 2020/0139861 A1* | 5/2020 | Nevarez | ................. B60N 3/06 |
| 2021/0114488 A1 | 4/2021 | Wong et al. | |
| 2021/0316638 A1* | 10/2021 | Naidenov | .............. B60N 2/015 |

FOREIGN PATENT DOCUMENTS

| | | | |
|---|---|---|---|
| CN | 111483368 B * | 6/2021 | ............ B60N 2/242 |
| DE | 19523014 A1 | 11/1995 | |
| DE | 60108565 T2 | 1/2006 | |
| EP | 3434510 A1 * | 1/2019 | ............ B60N 2/005 |
| EP | 4101722 A1 * | 12/2022 | ............ B60N 2/242 |
| GB | 2106379 A | 4/1983 | |
| KR | 20010017449 A | 3/2001 | |
| KR | 100300018 B1 | 9/2001 | |
| KR | 102004022274 A | 3/2004 | |

OTHER PUBLICATIONS

Office Action for German Patent Application No. 10 2022 107 682.2, dated Dec. 9, 2022, (12 pages).
Office Action for Sweden Patent Application No. 2250608-3, dated Dec. 7, 2023 (8 pages).

* cited by examiner

SEATING IN A VEHICLE

FIELD

This disclosure pertains to seating in a vehicle.

More specifically, this disclosure pertains to a seating in a passenger compartment of a vehicle wherein the seating comprises parts can be used interchangeably irrespective of side of the vehicle.

BACKGROUND

Transportation modes, such as a bus, an aircraft, and other passenger carrying articles of transportation, that accommodate a large number of individuals require a large number of seats for the large number of individuals.

Structures, buildings or other similar environments such as theatres, auditoriums, classrooms, etc., that house a large number of individuals require a large number of seats for the large number of individuals.

Providing a large number of seats for a large number of individuals, whether in a transportation mode or an environment that houses the large number of individuals often contributes significantly to costs involved in manufacture of the transportation mode or the environment. Current seat designs are disadvantaged in that their manufacture requires a large number of different parts. The large number of different parts required in manufacture of a seat results in increased complexity and difficulty in assembling together the large number of different parts in manufacturing a seat. Increased complexity and difficulty in assembling together the large number of different parts results in increased time needed for assembling together different parts, which increases cost of manufacturing the seat. The large number of different parts also requires a large inventory of parts, which also increases costs of manufacturing a seat.

SUMMARY

This disclosure relates to seating for a vehicle. According to one embodiment, seating in a passenger compartment of a vehicle comprises a first base in the passenger compartment of the vehicle. First and second apertures are disposed on opposite ends of the first base. A modified first base having third and fourth apertures is located adjacent the first base. A first rod is disposed in the first and third apertures. A second rod is disposed in the second and fourth apertures. A seat module has an end support including a fifth aperture for accepting the first rod. An opening is disposed on the end support for accepting the second rod.

DETAILED DESCRIPTION

Figure 1:
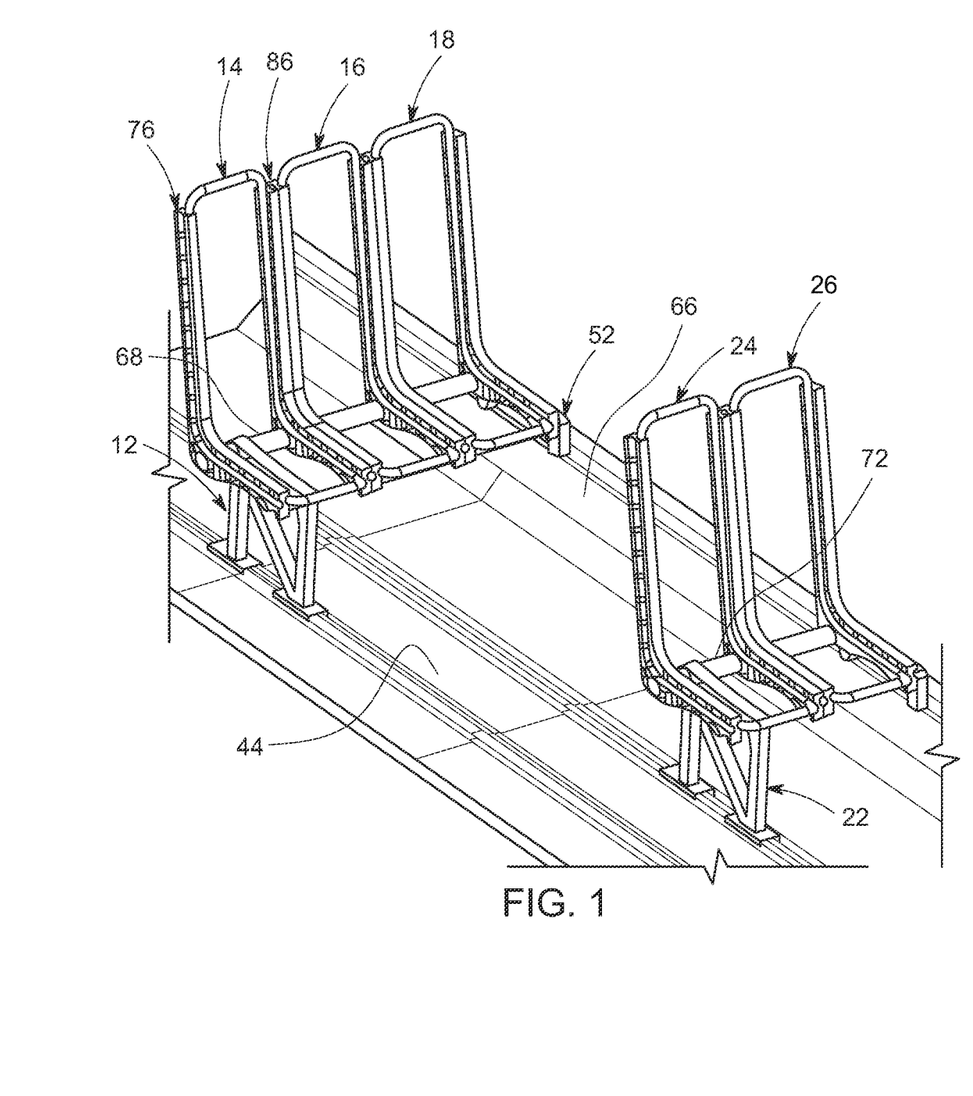
FIG. 1 is a perspective view of seat modules disclosed herein.

FIG. 1 is a perspective view of one embodiment of seating described herein disposed in a passenger compartment of a vehicle, such as a bus and the like. The embodiment of FIG. 1 comprises a first base 12 supports a first seat module 14, a second seat module 16 and a third seat module 18 substantially juxtaposed. A second base 22 supports a fourth seat module 24 and a fifth seat module 26. The second base 22 is spaced longitudinally from the first base 12 and supports both the fourth seat module 24 and the fifth seat module 26 longitudinally from of the first seat module 14, the second seat module 16 and the third seat module 18. The first base 12 has a construction and a configuration identical to a construction and a configuration of the second base 22. These identical constructions and configurations of both the first base 12 and the second base 22 enable the first base 12 and the second base 22 to be used interchangeably. Put another way, the first base 12 has a first dimension, such as length, height, width, thickness and the like, and the second base 22 has a second dimension, such as length, height, width, thickness and the like, and the first dimension and the second dimension are identical.

Figure 2:
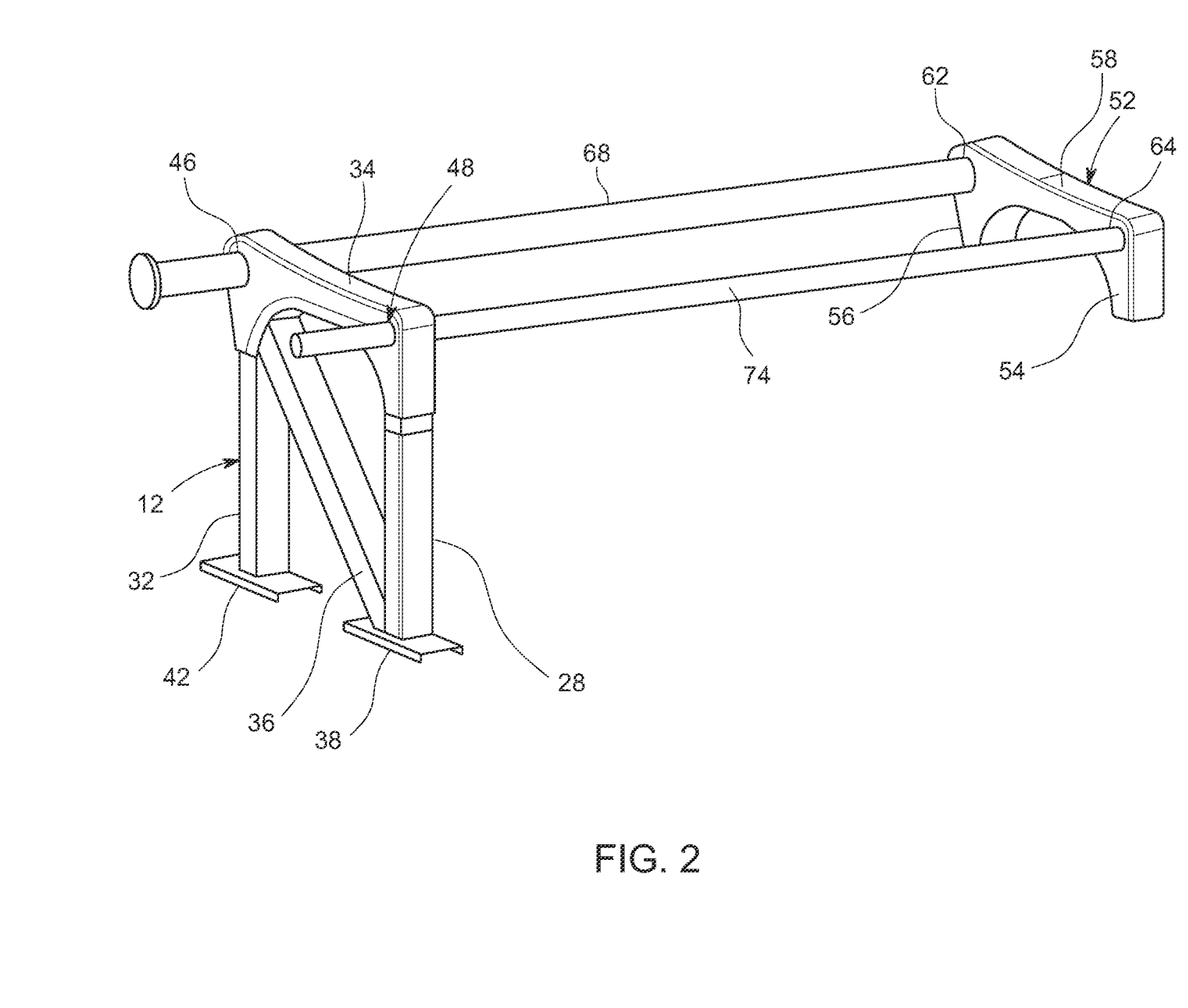
FIG. 2 is a perspective view of elements of a seat module of FIG. 1.

FIG. 2 is a perspective view of the first base 12 of FIG. 1. The construction of the first base 12 in FIG. 2 includes a forward column 28 and a rearward column 32 that are vertically oriented and longitudinally spaced from each other. The forward column 28 and rearward column 32 are connected by a beam 34, horizontally oriented in the Figures, that extends longitudinally between and is connected to ends of the forward column 28 and the rearward column 32. A surface of the beam 34 defines a surface of the first base 12. A diagonal column 36 interconnects the forward column 28 and the rearward column 32 and adds structural rigidity to the first base 12. The forward column 28 has a forward column bottom surface 38 and the rearward column 32 has a rearward column bottom surface 42 that are both configured for engagement with a surface 44, shown in FIG. 1, that supports the first base 12 in a vertical orientation with respect to the surface 44. In some embodiments, the surface 44 corresponds to a floor of a passenger compartment of a vehicle. A surface of the beam 34 is vertically offset from the forward column bottom surface 38 and the rearward column bottom surface 42. Configuration of the first base 12 represented in FIG. 2 can be constructed as a single piece, such as by injection molding], compression molding, other equivalent types of molding and the like. The first base 12 can comprise any suitable material, such as a plastic, a composite material, other similar types of materials and the like.

There is a first aperture 46 in the first base 12. The first aperture 46 is positioned adjacent an end of the base rearward column 32 and an end of the beam 34. The first aperture 46 may be substantially cylindrical extending through an end of the first base 12. In some embodiments, the first aperture 46 may have a different cross-section and may extend partially through an end of the first base 12.

A second aperture 48 extends through the first base 12. The second aperture 48 is positioned toward an end of the base forward column 28 and adjacent the beam 34. The second aperture 48 is disposed on the first base 12 on an end thereof opposite to the first aperture 46 such that the first aperture 46 and the second aperture 48 are located on opposite ends of the first base 12. The second aperture 48 may be substantially cylindrical extending through an end of the first base 12. In some embodiments, the second aperture 48 has a different configuration, and may extend partially through the first base 12.

There is also a modified first base 52 represented in FIG. 2. In one embodiment, the modified first base 52 has a configuration substantially similar to a portion of the first base 12. The modified first base 52 has a third dimension, such as length, height, width, thickness and the like, and a portion of the first base 12 has a fourth dimension, such as length, height, width, thickness and the like. The third dimension and the fourth dimension are identical.

The modified first base 52 includes a shortened base forward column 54 and a shortened base rearward column 56. A beam 58 connects the shortened base forward column 54 and the shortened base rearward column 56. A fourth aperture 62 and a third aperture 64 are disposed on the modified first base 52 such that the fourth aperture 62 and the third aperture 64 are located on opposite ends of the modified first base 52. In some embodiments, such as those not needing height of the first base 12, the modified first base 52 may be used instead of the first base 12. In these embodiments, the modified first base 52 engages with a second surface 66, shown in FIG. 1, that is offset from the first surface 44 engaged by the first base 12. In one embodiment, the second surface 66 is disposed adjacent another structure, such as a wall and the like, located within the passenger compartment of the vehicle.

The modified first base 52 can be positioned adjacent the first base 12, with the first base 12 and the modified first based 52 positioned substantially juxtaposed. In this embodiment, the first base 12 and the modified first base 52 support a first seat module 14 or a first seat module 14 and a second seat module 16 substantially juxtaposed in a row of seat modules.

A first rod 68 is disposed in the first aperture 46 of the first base 12. The first rod 68 has a cylindrical exterior surface that complements a cylindrical inner surface of the first aperture 46 in the first base 12. In essence, interior surface of the first aperture 46 in the first base 12 complements an outer surface of the first rod 68. The first rod 68 is disposed in the fourth aperture 62 of the modified first base 52. The first rod 68 is positioned in the first aperture 46 of the first base 12 and in the fourth aperture 62 of the modified first base 52. With the first base 12 and the second base 22 positioned longitudinally spaced from each other as represented in FIG. 1, the first rod 68 is positioned horizontally through the first aperture 46 in the first base 12 and a second rod 74 is positioned horizontally in the first aperture 46 on the second base 22.

As represented in FIG. 2, the second rod 74 is positioned horizontally in the second aperture 48 of the first base 12. The second rod 74 is positioned horizontally in the third aperture 64 of the modified first base 52. The second rod 74 is supported by the first base 12 and the modified first base 52 and is parallel with the first rod 68.

Figure 3:
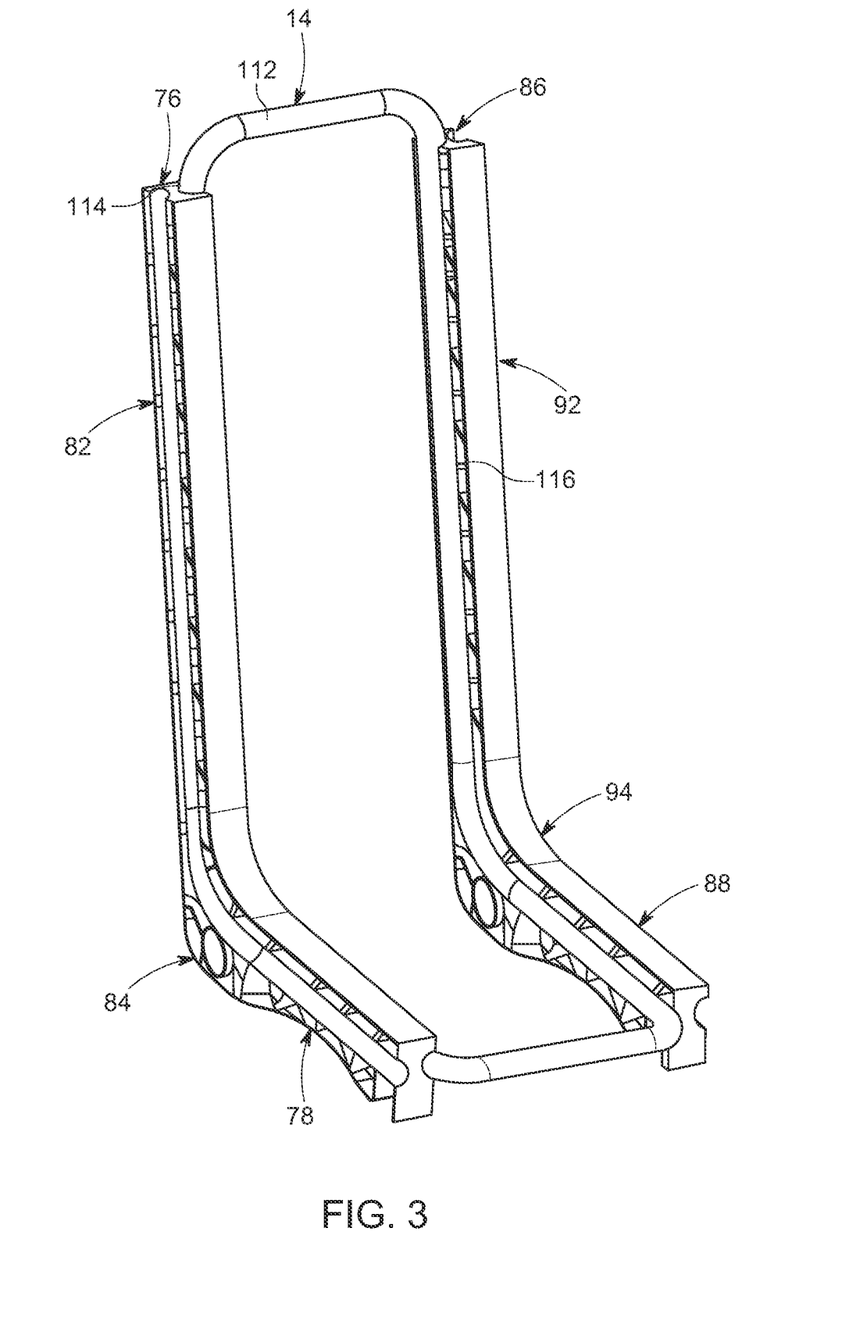
FIG. 3 is a perspective view of other elements of a seat module of FIG. 1.

While the following disclosure specifically discusses the first seat module 14, it is to b understood that this discussion applies among the first seat module 14, the second seat module 16 and the third seat module 18. As represented in FIG. 3, there is a first end support 76 on the first seat module 14. The first end support 76 is shown separated from the first seat module 14 in FIGS. 4-6. The first end support 76 has a first bottom section 78 that is horizontally oriented, a first back section 82 that is vertically oriented and a first bend section 84 connecting the first bottom section 78 and the first back section 82. There is a second end support 86 on the first seat module 14. The second end support 86 has a second bottom section 88 that is horizontally oriented, a second back section 92 that is vertically oriented and a second bend section 94 connecting the second bottom section 94 and the second back section 92. The first end support 76 has a fourth dimension, such as length, height, width, thickness and the like, and the second end support 86 has a fifth dimension, such as length, height, width, thickness and the like. The fourth dimension and the fifth dimension are identical. The first end support 76 and the second end support 86 can be comprise a plastic material that may be injection molded, compression molded, or molded in another equivalent manner. In some embodiments, the first end support 76 and the second end support 86 comprise a composite material, other equivalent materials and the like.

Figure 4:
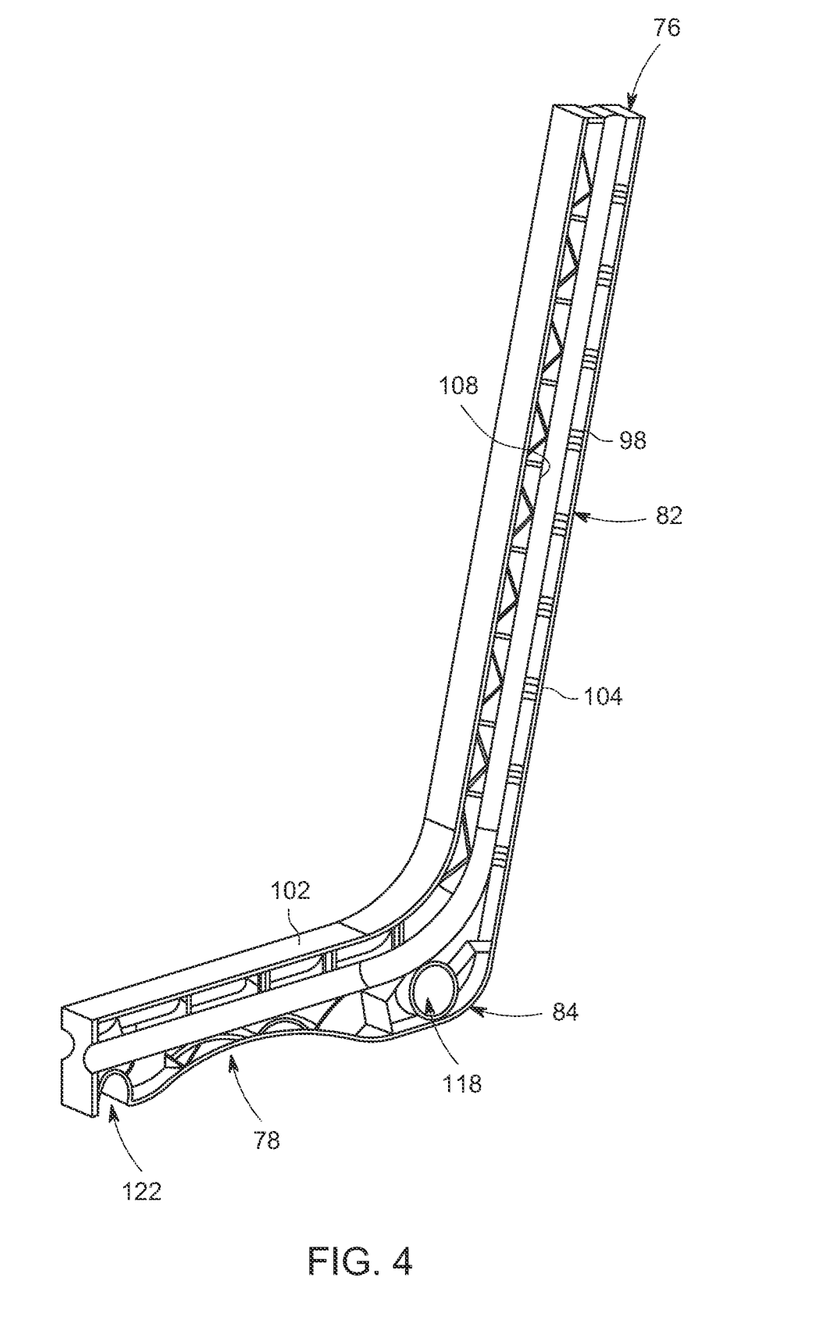
FIG. 4 is a perspective view of another element end support of a seat module of FIG. 1.
Figure 5:
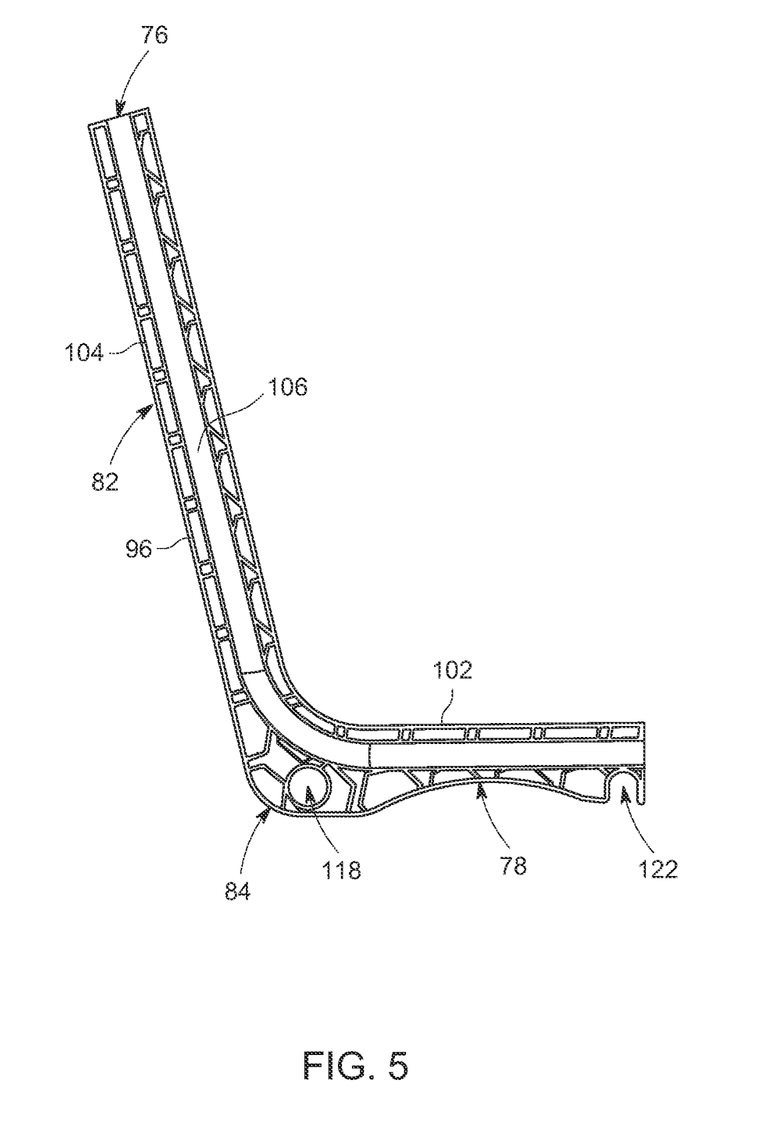
FIG. 5 is a side elevation view of the element of FIG. 4.
Figure 6:
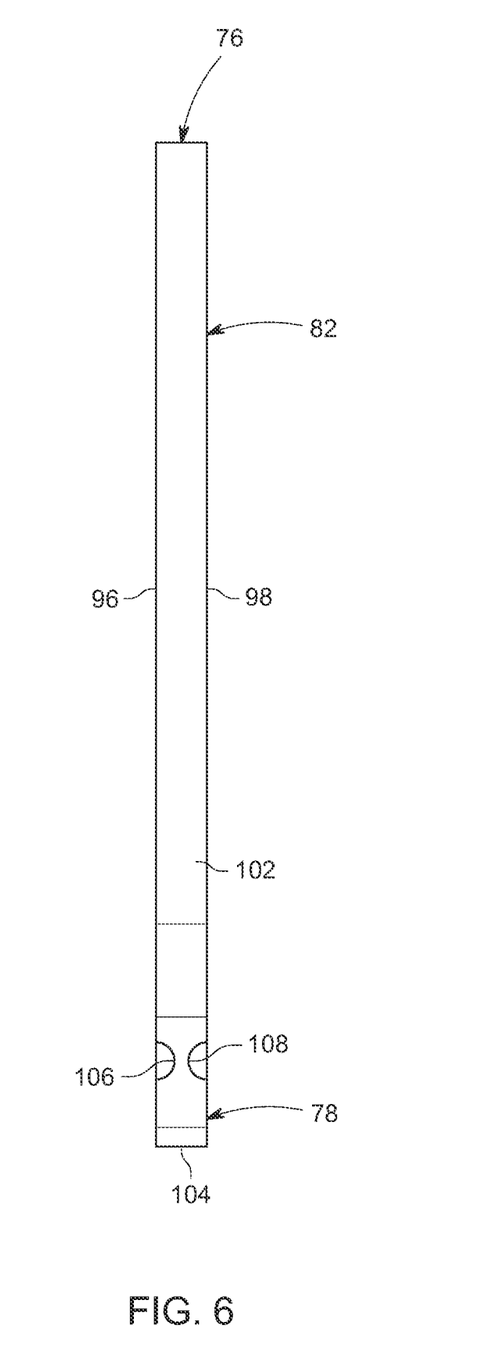
FIG. 6 is a front elevation view of the element of FIG. 4.

With the first end support 76 and the second end support 86 having identical dimensions, the following discussion of the first end support 76 applies similarly to the second end support 86. The first end support 76 has an L-shaped configuration with a horizontally oriented bottom section 78, a vertically oriented back section 83 and a bend section 84 connecting the bottom section 78 and the back section 82 as one integral piece. As represented in FIGS. 4-6, the first end support 76 has a left hand side surface 96 and an opposite right hand side surface 98. The first end support 76 has a top surface 102 that extends between the left hand side surface 96 and the right hand side surface 98, and an opposite bottom surface 104 that extends between the left hand side surface 96 and the right hand side surface 98. The left hand side surface 96 and the right hand side surface 98 are mirror images of each other.

As shown in FIG. 5, a first groove surface 106 is recessed into the left hand side surface 96. The first groove surface 106 has a U-shaped cross-section configuration or a semi-circular shaped cross-section configuration. The first groove surface 106 extends along the left hand side surface 96 of the first end support 76 across the first bottom section 76, across the first back section 82 and across the first bend section 84 of the first end support 76. As shown in FIG. 4, the right hand side surface 98 of the first end support 76 has a second groove surface 108 recessed into the right hand side surface 98. The second groove surface 108 has a U-shaped cross-section configuration or a semi-circular cross-section configuration. The second groove surface 108 extends along the right hand side surface 98 of the first end support 76 across the first bottom section 78, the first back section 82 and the first bend section 84 of the first end support 76.

FIG. 4 shows the first end support 76 and the second end support 86 spaced laterally from each other. The second groove surface 108 in the right hand side surface 98 of the first end support 76 opposes the first groove surface 106 in the left side surface 96 of the second end support 86.

A frame 112 is connected to the first end support 76 and the second end support 86. In one embodiment, the frame 112 is a tube formed in a rectangular, loop configuration. The frame 112 has a frame first side 114 that is positioned in the second groove surface 108 of the first end support 76 connecting the frame 112 to the first end support 76. The frame 112 has a frame second side 116 that is positioned in the first groove surface 106 of the second end support 86 connecting the frame 112 to the second end support 86. A fifth aperture 118 is disposed in the first end support 76 through the first bend section 84. In the illustrated embodiment, the fifth aperture 118 corresponds to the first aperture 46 on the first seat module 14 in that the first rod 68 can extend through the fifth aperture 118 thereby connecting the first end support 76 and the second end support 86 first seat module 14 to the first rod 68. The fifth aperture 118 receives the first rod 68 thereby connecting the first seat module 14 to the first base 12. In this manner, the first seat module 14 is connected to the first surface 44 and thereby to the passenger compartment of the vehicle.

With the first rod 68 connecting the first seat module 14 to the first base 12, the first seat module 14 is rotatable about the first rod 68 relative to the first base 12. The first rod 68 is moveable horizontally to insert the first rod 68 through the fifth aperture 118 in the first seat module 14 and through the first aperture 46 in the first base 12 connecting the first seat module 14 to the first base 12. The first rod 68 is moveable horizontally to withdraw the first rod 68 from the fourth aperture 118 in the first seat module 14 and from the first aperture 46 in the first base 12 thereby disconnecting the first seat module 14 from the first base 12.

FIG. 5 shows an opening 122 in the first end support 76 of the first seat module 14. The opening 122 in the first seat module 14 receives a portion of the second rod 74 thereby connecting to and supporting the first seat module 14. In some embodiments, the opening 122 may receive a portion of the second rod 74 thereby joining the second rod 74 with the first seat module 14 allowing the first seat module 14 to rotate around the second rod 74.

Figure 7:
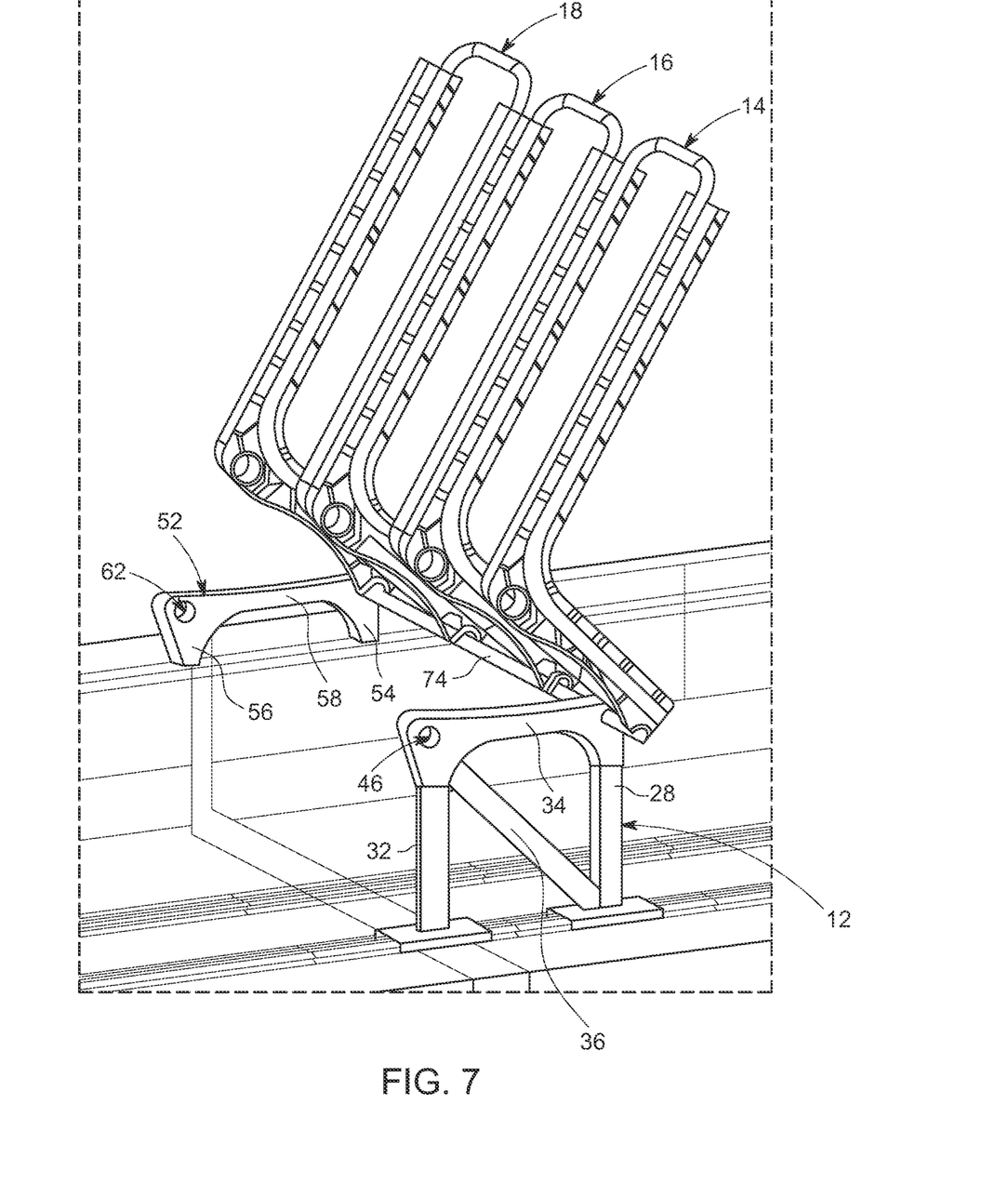
FIG. 7 is a perspective view of assembly of seat modules disclosed herein.
Figure 8:
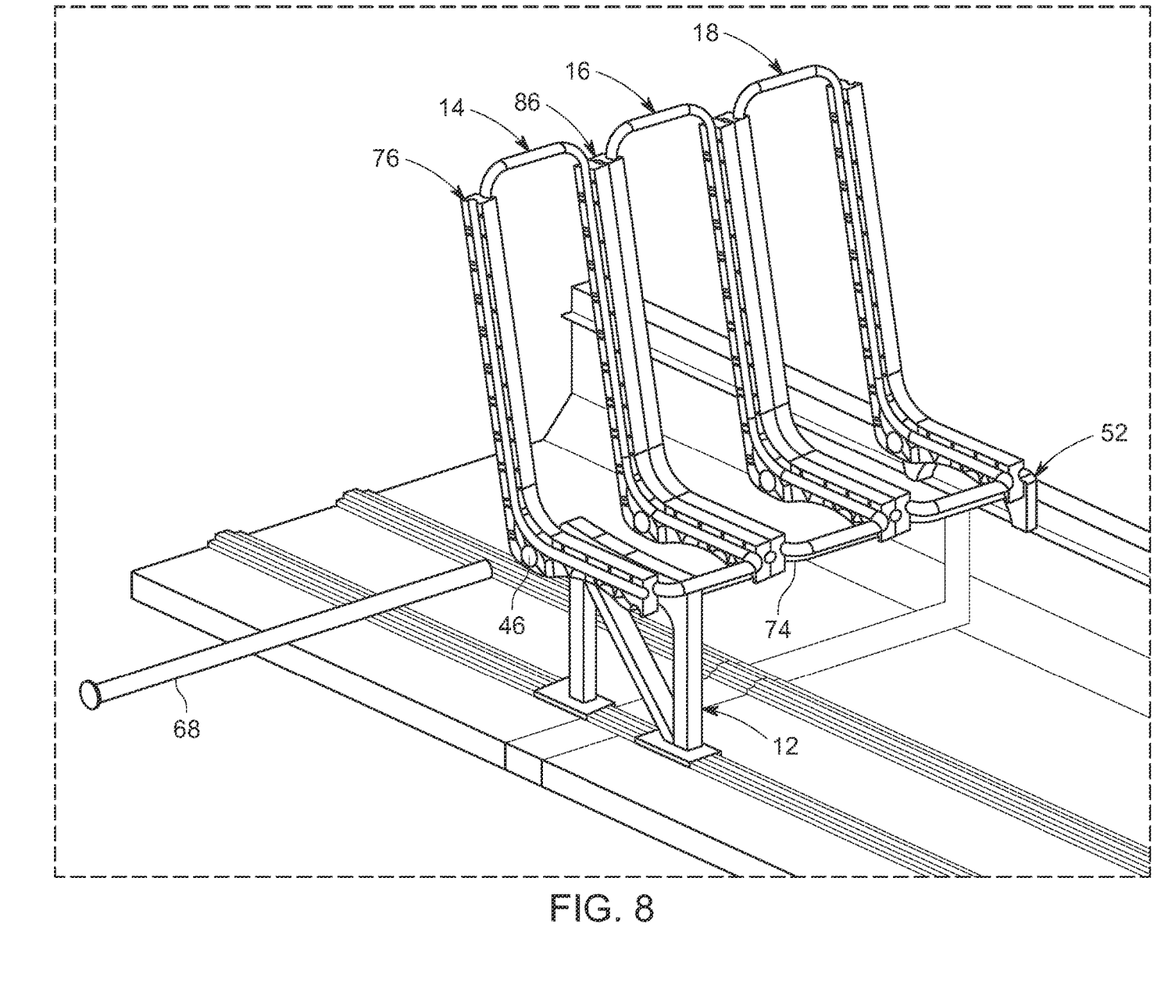
FIG. 8 is a perspective view of assembling seat modules disclosed herein.

FIG. 7 illustrates one method of assembling the first seat module 14, the second seat module 16 and the third seat module 18 to the first base 12 and to the modified first base 52. The second rod 74 is inserted through the first aperture 46 in the first base 12 10 and the third aperture 64 in the modified first base 52. The seat module 14, seat module 16 and seat module 18 are substantially juxtaposed on the second rod 74. An opening 122 in each of the first end supports 76 of the seat module 14, seat module 16 and seat module 18 are moved towards the second rod 74 thereby each opening 122 engage adjacent portions of the second rod 74. If desired, the seat module 14, the seat module 16 and the seat module 18 can be rotated about the second rod 74, viz. in a counterclockwise direction from positions of the seat modules 14, seat module 16 and seat module 18 represented in FIG. 7. The seat modules 14, seat module 16 and seat module 18 may be rotated about the second rod 74 until the fifth aperture 118 in the end supports 76 of the seat module 14, seat module 16 and seat module 18 align with the first aperture 46 on the first base 12 and the fourth aperture 62 through the modified first base 52 as represented in FIG. 8.

The first rod 68 is inserted through the aligned fifth aperture 118 in each of the end supports 76 of the seat modules 14, 16, 18, the first aperture 46 in the first base 12 and the fourth aperture 62 in the modified first base 52, completing assembly of the seat modules 14, 16, 18 to the first base 12 and to the modified first base 52. Although FIGS. 7 and 8 represent three seat modules, viz. the first seat module 14, the second seat module 16 and the third seat module 18, being connected to the first base 12 and the modified first base 52, any desired number of seat modules, possibly with appropriate modification, can comprise seating a vehicle. A substantially similar method of assembly may be used to connect a single seat module 14, or a pair of seat modules 14, 16 or any combination of seat modules 14, 16 or 18 to the first base 12, the modified first base 52 or any combination of first base 12 and modified first base 52.

What is claimed is:

1. Seating disposed in a passenger compartment of a vehicle, the passenger compartment of the vehicle having a first surface and a second surface, the second surface being offset from the first surface, the seating comprising:
   first base disposed on the first surface of the passenger compartment of the vehicle;
   a first aperture disposed on the first base;
   a second aperture disposed on the first base such that the first aperture and the second aperture are located on opposite ends of the first base;
   a modified first base disposed on the second surface of the passenger compartment of the vehicle;
   a third aperture disposed on the modified first base;
   a fourth aperture disposed on the modified first base such that the third aperture and the fourth aperture are located on opposite ends of the modified first base;
   a removable first rod disposed in the first aperture on the first base and the third aperture on the modified first base and extending between the first base and the modified first base;
   a second rod disposed in the second aperture on the first base and the fourth aperture on the modified first base and extending between the first base and the modified first base;
   a first seat module having an end support including a fifth aperture for rotatably accepting the first rod; and
   an opening disposed on an end of the end support opposite to the fifth aperture for accepting and rotating around the second rod, while allowing the seat module to rotate around the first rod after installation.

2. Seating as defined in claim 1 further comprising:
   a second seat module wherein the first seat module and the second seat module are identical.

3. Seating as defined in claim 1 further comprising:
   a second seat module having a second end support including the fifth aperture for accepting the first rod; and
   a second opening disposed on the second end support for accepting the second rod.

4. Seating as defined in claim 3 wherein the first seat module and the second seat module are juxtaposed within the passenger compartment of the vehicle.

5. Seating as defined in claim 1 wherein the vehicle is a bus.

* * * * *